US00RE35388E

United States Patent [19]

Kimura et al.

[11] E Patent Number: Re. 35,388

[45] Reissued Date of Patent: Dec. 3, 1996

[54] MULTIPLE COLOR INK RIBBON CASSETTE

[75] Inventors: Koichi Kimura; Yasushi Ishikawa, both of Tokyo, Japan

[73] Assignee: Seiko Precision Inc., Tokyo, Japan

[21] Appl. No.: 535,838

[22] Filed: Sep. 29, 1995

Related U.S. Patent Documents

Reissue of:

[64] Patent No.: 5,382,103
Issued: Jan. 17, 1995
Appl. No.: 99,033
Filed: Jul. 28, 1993

[30] Foreign Application Priority Data

Jul. 30, 1992 [JP] Japan ..... 4-053631 U

[51] Int. Cl.[6] ..... B41J 33/32

[52] U.S. Cl. ..... 400/248; 400/207

[58] Field of Search ..... 400/248, 207, 400/247, 248.1, 243

[56] References Cited

U.S. PATENT DOCUMENTS

| | | | |
|---|---|---|---|
| 4,492,484 | 1/1985 | Akazawa et al. | 400/248 |
| 4,650,355 | 3/1987 | Cassiano et al. | 400/248 |
| 4,712,931 | 12/1987 | Oshima | 400/248 |
| 4,874,262 | 10/1989 | Yokoi et al. | 400/248 |

FOREIGN PATENT DOCUMENTS

| | | | |
|---|---|---|---|
| 0010480 | 1/1986 | Japan | 400/248 |
| 0080074 | 4/1987 | Japan | 400/248 |
| 63-37248 | 3/1988 | Japan . | |
| 214443 | 4/1990 | Japan . | |

*Primary Examiner*—Edgar S. Burr
*Assistant Examiner*—Anthony H. Nguyen
*Attorney, Agent, or Firm*—Amster, Rothstein & Ebenstein

[57] ABSTRACT

To reduce the cost of a cassette case by simplifying the design, a cassette case 10 is made up of a case body 26 and a case cover 27 fitted to the upper surface of the case body 26, a ribbon guide 28 is fitted to the outside of the cassette case 10 in such a way that it is free to slide in the longitudinal direction, and at times of printing color changeover the required color band of the multiple color ink ribbon 11 is guided over the end of the printing head by this ribbon guide 28. The ribbon guide 28 is provided with guide portions 36, 37 facing both of the side surfaces of the case cover 27, and the movement of the ribbon guide 28 in the direction of the length of the cassette case 10 is guided by these guide portions 36, 37 sliding along the side surfaces of the case cover 27.

1 Claim, 5 Drawing Sheets

MULTIPLE COLOR INK RIBBON CASSETTE

Matter enclosed in heavy brackets [ ] appears in the original patent but forms no part of this reissue specification; matter printed in italics indicates the additions made by reissue.

FIELD OF INDUSTRIAL USE

This invention relates to a multiple color ink ribbon cassette for use in a printer.

PRIOR ART

In an existing multiple color ink ribbon cassette of this type (Japanese Laid-Open Utility Model Publication Patent No. S.63-37248), a ribbon guide is mounted on a cassette case fitted with a multiple color ink ribbon in such a way that the ribbon guide is free to slide along the length of the cassette case, and the required color band of the multiple color ink ribbon is firmly guided by this ribbon guide into position over the printing head.

The conventional construction of this kind of multiple color ink ribbon cassette is shown in FIG. 5. In this construction, a cassette case 1 is of boxlike shape and is made up of a case body 2 and a case cover 3; a longitudinal groove 2a is provided in the underside of the case body 2, and a longitudinal tongue projection 2b is provided on one side of the case body 2, and a further longitudinal groove 3a is provided in the top surface of the case cover 3. A ribbon guide 4 is provided with a projection 4a that slidably mates with the groove 2a in the case body 2 and another projection 4b that slidably mates with the groove 3a in the case cover 3, and the ribbon guide 4 is attached to the cassette case 1 by these projections 4a and 4b in such a way that it is free to slide longitudinally along the cassette case 1. The ribbon guide 4 also has a groove 4c that slidably mates with the tongue projection 2b on the case body 2, and the ribbon guide 4 is guided in the direction of the length of the cassette case 1 by the mating of this groove 4c with the tongue projection 2b of the case body 2. In FIG. 5, reference numeral 5 denotes a multiple color ink ribbon, and reference numeral 6 denotes a printing head.

However, in the conventional construction described above, because the ribbon guide 4 is fitted to the cassette case by tongue and groove mating, and the movement of the ribbon guide 4 along the length of the cassette case 1 is guided by this mating, the necessary tongue projections and grooves for longitudinally guiding the ribbon guide 4 have to be provided in the case body 2 and the case cover 3 of the cassette case 1, and as a result of this the cassette is of complicated design and is costly.

This invention aims to provide a multiple color ink ribbon cassette with a simplified cassette case that can be produced at reduced cost.

SUMMARY OF THE INVENTION

The multiple color ink ribbon cassette of this invention is made up of a cassette case fitted with a multiple color ink ribbon; a ribbon guide, mounted on the cassette case in such a way that it is free to slide in the direction of the length of the cassette case, which guides the multiple color ink ribbon over the end of a printing head; a case cover mounted on the cassette case; and guide portions mounted on the ribbon guide facing the side surfaces of the case cover in such a way that the movement of the ribbon guide in the direction of the length of the cassette case is guided by the guide portions sliding along the side surfaces of the case cover.

In this invention, because the ribbon guide is guided in the direction of the length of the cassette case by guide portions sliding along the side surfaces of the case cover, it is not necessary to provide tongue projections or grooves in the case body or the case cover of the cassette case for guiding the ribbon guide in the longitudinal direction.

DETAILED DESCRIPTION OF PREFERRED EMBODIMENTS

A preferred embodiment of a multiple color ink ribbon cassette according to the present invention will now be described, with reference to the accompanying drawings.

Figure 1:
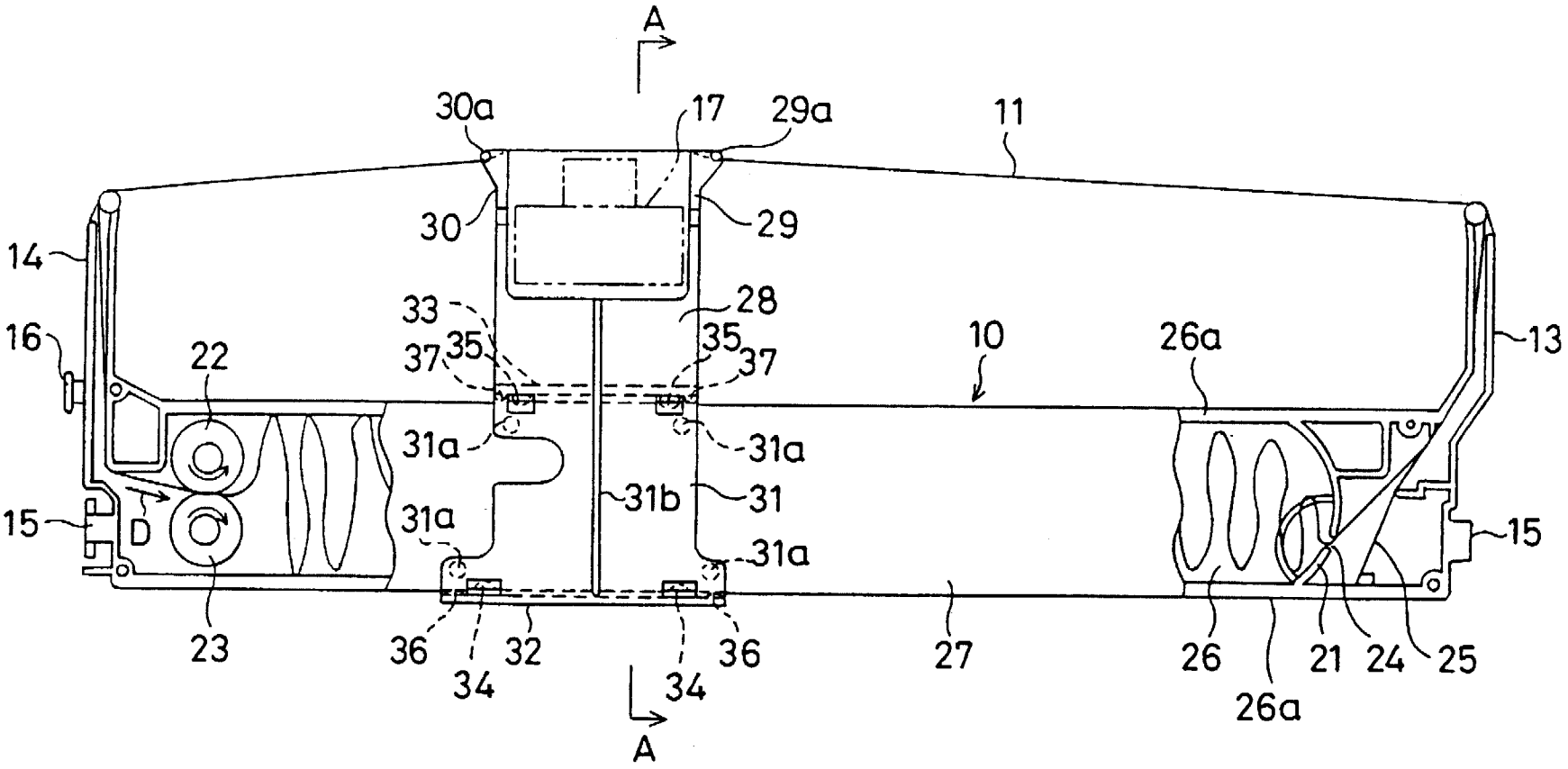
FIG. 1 is a plan view of a multiple color ink ribbon cassette according to a preferred embodiment of the present invention.

As shown in FIG. 1, the multiple color ink ribbon cassette of this preferred embodiment has a box-shaped cassette case 10, and this cassette case 10 is fitted with an endless multiple color ink ribbon 11 divided up across its width into several parallel bands of different colors such as yellow, magenta, cyan, and black.

The cassette case 10 is provided with two arms 13 and 14 projecting from opposite ends of the cassette case horizontally and in the same direction as each other, and also has a bearing portion 15 formed at each end and a driving shaft portion 16 projecting from one end.

Figure 2:
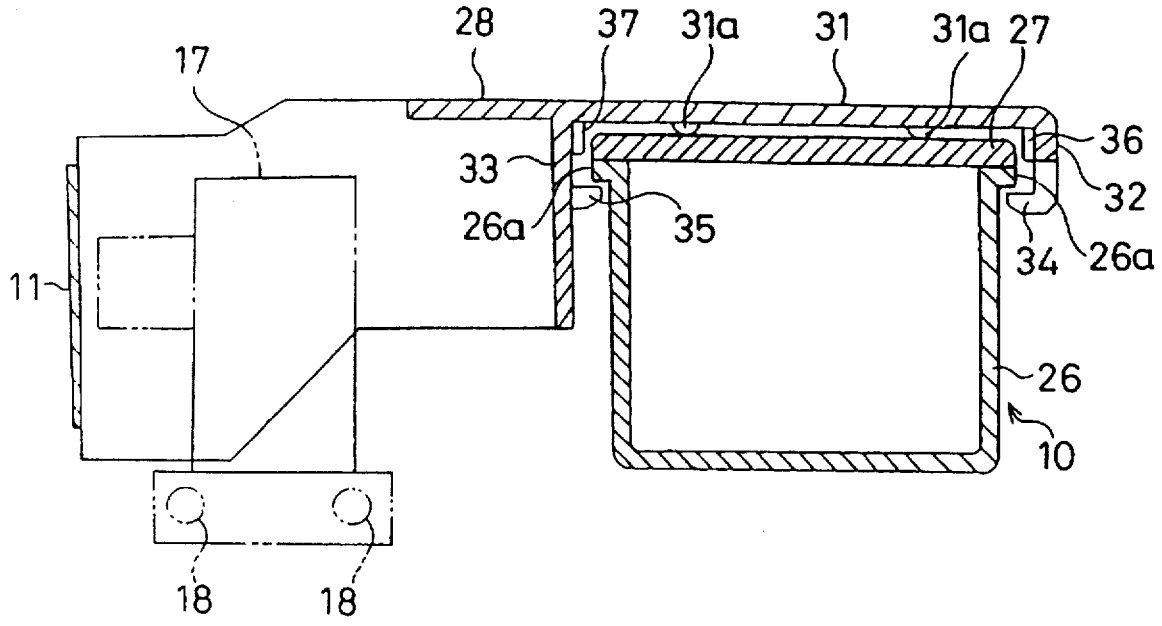
FIG. 2 is a cross-section view along the line A—A.

A multiple color ink ribbon 11 passes through the inside of the cassette case 10 and is strung across between the ends of the arms 13 and 14, where it is exposed to the outside. When the cassette is in position in a printer, the printing head 17 of the printer, shown by broken lines in FIG. 1, is in some position between the arms 13 and 14, and, as shown in FIG. 2, faces the multiple color ink ribbon 11. The printing head 17 is mounted on a pair of guide shafts 18, shown in FIG. 2 by broken lines, in such a way that it is free to move perpendicular to the direction of the paper feed, and during printing it moves guided by the guide shafts 18 from side to side along the length of the cassette case 10 between the arms 13 and 14.

Figure 3:
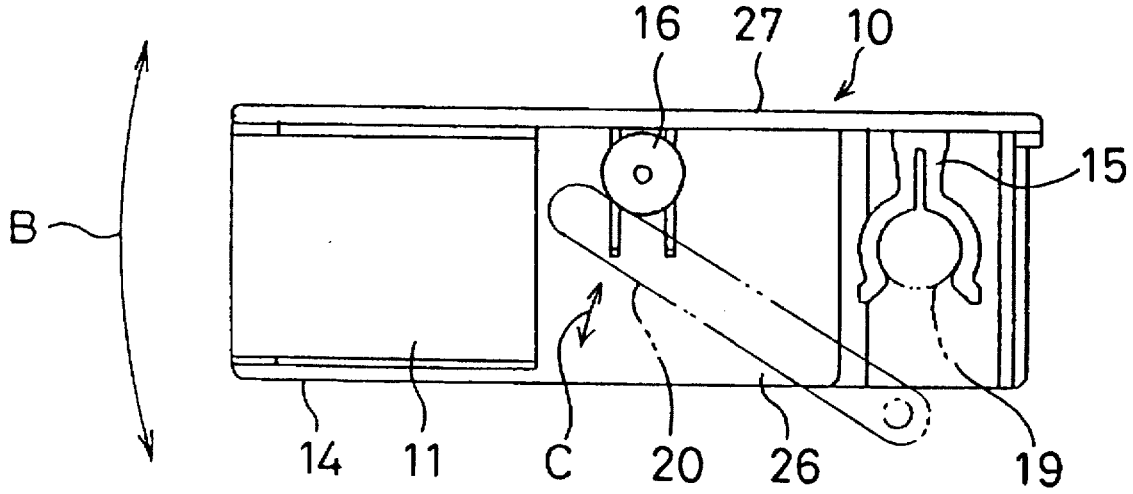
FIG. 3 is a left side elevation view of the multiple color ink ribbon cassette of FIG. 1.
Figure 4:
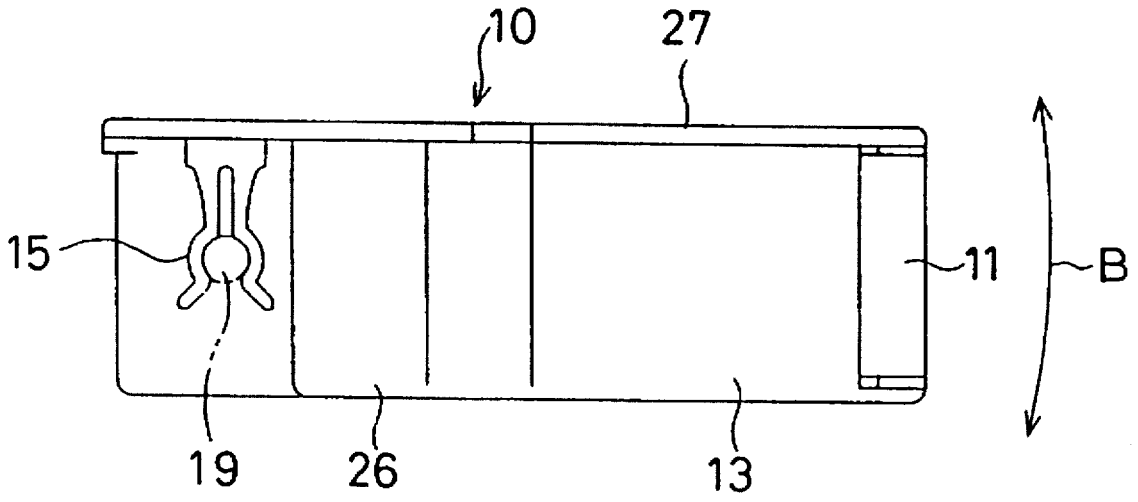
FIG. 4 is a right side elevation view of the multiple color ink ribbon cassette of FIG. 1.
Figure 5:
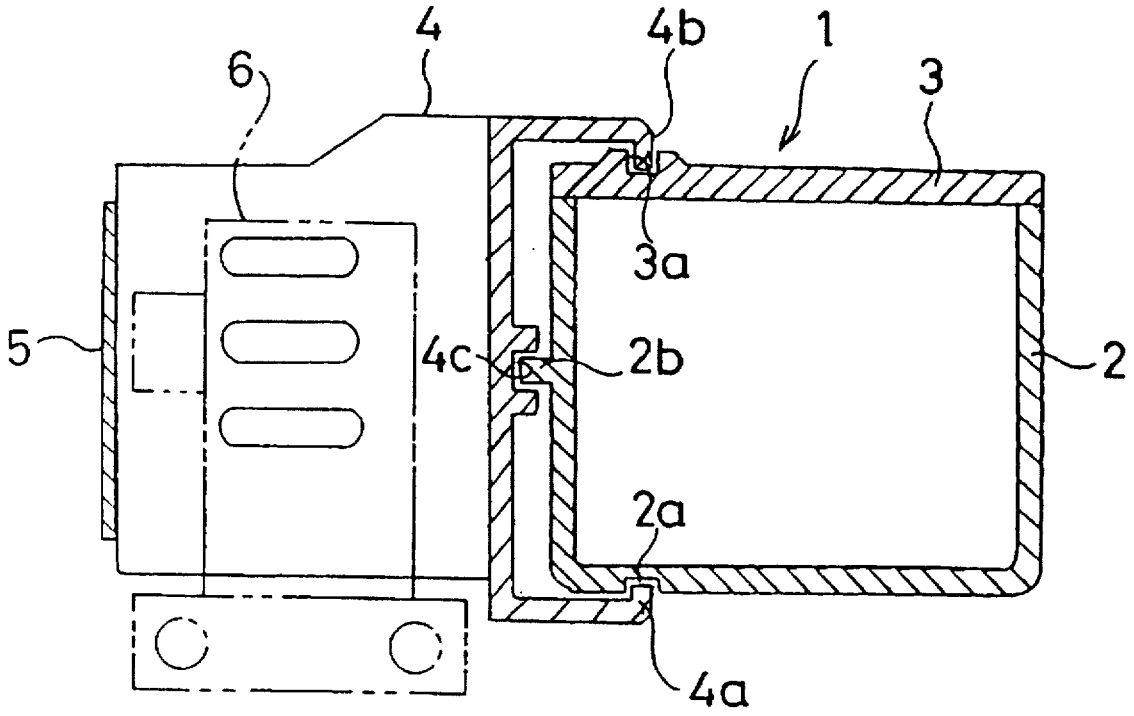
FIG. 5 PRIOR ART
FIG. 5 is a cross-section view showing the construction of a prior art multiple color ink ribbon cassette.

When the cassette is in position in a printer, the bearing portions 15 mate removably with the stationary shafts 19, shown by broken lines in FIGS. 3 and 4, and serve to pivotally support the cassette case 10. The cassette case 10 is mounted in such a way that during printing the printing color can be changed by the cassette case 10 being pivoted about the stationary shafts 19 in the direction indicated by the arrow B so that the printing head 17 faces each of the color bands of the multiple color ink ribbon selectively.

When the cassette is in position in a printer, the shaft portion 16 engages with a driving lever 20 of the printer, as shown by broken lines in FIG. 3. At times of printing color changeover the driving lever 20 is caused to pivot in the direction indicate by the arrow C, and this pivoting action causes the cassette case 10 to pivot about the stationary shafts 19 and the required color band of the multiple color ink ribbon is brought into position in front of the printing head 17.

Inside the cassette case 10 a partition wall is mounted at one end and a pressure roller 22 and a ribbon driving roller 23 are mounted at the other end, and the multiple color ink ribbon 11 is snaked up between the partition wall 21 and the pressure roller 22 and the ribbon driving roller 23. A narrow slit 24 is provided in the partition wall 24, and the multiple color ink ribbon 11 passes through this slit 24 and is pulled out from between the partition wall 21 and the pressure roller 22 and the ribbon driving roller 23 into the inside of the arm 13, passes through the arm 13, and extends between the ends of the arms 13 and 14.

The pressure roller 22 is held in sprung contact through the multiple color ink ribbon 11 with the ribbon driving roller 23 by a holding means not shown in the drawings. The multiple color ink ribbon passes out from between the rollers 22 and 23 and the partition wall 21 between the pressure roller 22 and the ribbon driving roller 23, passes through the inside of the arm 14, and extends between the ends of the arms 13 and 14.

When the cassette is in position in a printer, the ribbon driving roller 23 mates with a drive shaft of the printer not shown in the drawings and during printing is rotated by this drive shaft and together with the pressure roller 22 it conveys the multiple color ink ribbon in the direction indicated by the arrow D. Under this conveying force the used part of the multiple color ink ribbon is drawn in from between the arms 13 and 14, passes through the inside of the arm 14, passes between the ribbon driving roller 23 and the pressure roller 22, and enters the space between the partition wall and the ribbon driving roller 23 and the pressure roller 22, and at the same time the unused part of the multiple color ink ribbon 11 is drawn out through the slit 24 from between the partition wall 21 and the ribbon driving roller 23 and the pressure roller 22, passes through the inside of the arm 13, and passes out to between the arms 13 and 14. A resilient plate 25 which presses the multiple color ink ribbon 11 against the inner wall of the cassette case 10 is mounted between the arm 13 and the partition wall 21, and when the multiple color ink ribbon 11 is in motion it is put in tension by this pressing force.

The cassette case 10 is made up of a case body 26 and a case cover 27 fitted to the top of the case body 26, a ribbon guide 28 is mounted on the cassette case 10 in such a way that it is free to slide longitudinally between the arms 13 and 14, and this ribbon guide 28 firmly guides the required color band of the multiple color ink ribbon 11 over the end of the printing head 17 at times of printing color changeover. As shown in FIG. 2 also, the case body 26 is provided with longitudinal flange portions 26a along each side of the upper part of the case body 26, and the case cover 27 is fixed to these flange portions 26a.

The ribbon guide 28 is provided with a pair of arms 29 and 30, and when the cassette is in position in a printer the printing head 17 is positioned between these arms 29 and 30, and during printing the arms 29 and 30 are moved along together with the printing head 17. Two guide rollers 29a and 30a are rotatably mounted on the ends of the arms 29 and 30 respectively, and the multiple color ink ribbon 11 passes over the guide rollers 29a and 30a and is strung across between them. The guide rollers 29a and 30a guide the required color band over the end of the printing head 17 at times of printing color changeover.

As shown in detail in FIG. 2, this ribbon guide 28 is provided with a base board portion 31 facing and in slidable contact with the top surface of the case cover 27, and leg portions 32 and 33 project in the same direction as each other from the base board portion 31 such that the inner surface of one leg portion faces each side of the cassette case 10.

A number of hemispherical projections 31a are mounted on the part of the base board portion 31 that faces the case cover 27, and the base board portion 31 is slidably connected to the top surface of the case cover 27 through these projections 31. A strengthening rib 31b is provided on the upper surface of the base board portion 31.

The leg portions 32 and 33 are respectively provided with engaging projections 34 and 35, which face the undersides of the flange portions 26a of the case body 26, and guide portions 36 and 37, which face the side surfaces of the case cover 27, and the ribbon guide 28 is held onto the cassette case 10 by the engaging projections 34 and 35, securely and such that it can slide in the longitudinal direction, and the ribbon guide is also guided longitudinally along the cassette case by the guide portions 36 and 37 sliding along the side surfaces of the case cover 27. In other words, the flange portions 26a and the case cover 27 of the case body 26 are positioned between the engaging portions 34, 35 and the base board portion 31, and the ribbon guide 28 is attached to the cassette case 10 securely and in such a way that it is free to slide in the longitudinal direction, and the ribbon guide 28 is also guided, through the guide portions 36 and 37, by the side surfaces of the case cover 27 such that it slides in the longitudinal direction of the cassette case 10. The leg portions 32 and 33 are provided with elasticity so that some increase in the distance between the engaging projections 34 and 35 is allowed by elastic change of shape of the leg portions, and this elastic change of shape makes it possible for the ribbon guide 28 to be easily fitted onto the cassette case 10. Specifically, when the ribbon guide 28 is pressed down from above onto the cassette case 10, the engaging projections 34 and 35 abut with the edges of the top of the case cover 27, the legs 32 and 33 spread elastically so that the gap between the engaging projections 34 and 35 widens, this elastic shade change allows the case cover 27 and the flange portions 26a of the case body 26 to get in between the legs 32 and 33, the side surfaces of the case cover 27 are brought face-to-face with the guide portions 36 and 37, and as the top surface of the case cover 27 makes contact with the base board portion 31, the leg portions 32 and 33 return to their original shape and the engaging projections 34 and 35 clip into position facing the undersides of the flange portions 26a of the case body 26.

Because, according to this construction, the ribbon guide 28 is fitted with the guide portions 36 and 37 facing the side surfaces of the case cover 27, and the ribbon guide 28 is guided in the direction of the length of the cassette case 10 by these guide portions sliding along the side surfaces of the case cover 27, the kind of projections and grooves that up to now have had to be provided in such places as the case body 26 and the case cover 27 of the cassette case 10 are rendered unnecessary, and the design of the cassette case 10 can be simplified and its cost reduced.

In this preferred embodiment, the case body 26 is provided with the flange portions 26a, the case cover is fixed to these flange portions 26a, and the engaging projections 34 and 35 are positioned facing the undersides of these flange portions 26a, but this invention is not limited to this arrangement and, for example, a construction such as one in which the case cover 27 is wider than the case body 26 and projects at either side of the case body 26, and the engaging portions 34 and 35 are positioned facing the undersides of the case cover 27, could alternatively be used.

As explained above, in a multiple color ink ribbon cassette according to this invention, because the ribbon guide is provided with guide portions facing the side surfaces of the case cover and the ribbon guide is guided along the length of the cassette case by the guide portions sliding along the side surfaces of the case cover, the benefit that the kind of projections and grooves that up to now have had to be provided in such places as the case body and the case cover of the cassette case are rendered unnecessary, and the design of the cassette case can be simplified and its cost can be reduced, has been achieved.

We claim:

1. A multiple color ink ribbon cassette, comprising:

a cassettes case fitted with a multiple color ink ribbon and comprising a case body and a case cover with a pair of opposed side surfaces;

a ribbon guide, mounted on the cassette case in such a way that it is free to slide in the direction of the length of the cassette case, for guiding the multiple color ink ribbon over the end of a printing head;

a pair of longitudinal flange portions provided in the case body extending outwardly, along each side of the upper part of the case body, and which are mounted on the case cover;

a base board portion provided in the ribbon guide, and facing and in slidable contact with the top surface of the case cover; and a pair of leg portions provided in the ribbon guide, and projecting in the same direction from the base board portion such that an inner surface of each leg portion faces a respective side of the cassette case, and which are provided with guide portions facing the side surfaces of the case cover, and with engaging projections facing the undersides of the flange portions;

wherein the movement of the ribbon guide in the direction of the length of the cassette case is guided by the guide portions sliding along the side surfaces of the case cover, and the ribbon guide is held onto the cassette case by the engagement between the engaging projections and the flange portions and by the contact of the base board portion and the top surface of the case cover, securely and such that it can slide in the longitudinal direction.

* * * * *